(12) United States Patent
Collins

(10) Patent No.: US 12,170,731 B2
(45) Date of Patent: Dec. 17, 2024

(54) METHOD AND SYSTEM OF ALL-OR-NOTHING TRANSFORM (AONT) FOR INCREASING BLOCKCHAIN INTEGRITY

(71) Applicant: MASTERCARD INTERNATIONAL INCORPORATED, Purchase, NY (US)

(72) Inventor: Robert Collins, Blackrock (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 379 days.

(21) Appl. No.: 17/546,199

(22) Filed: Dec. 9, 2021

(65) Prior Publication Data

US 2023/0188355 A1 Jun. 15, 2023

(51) Int. Cl.
*H04L 9/32* (2006.01)

(52) U.S. Cl.
CPC .......... *H04L 9/3239* (2013.01); *H04L 9/3297* (2013.01)

(58) Field of Classification Search
CPC .............................. H04L 9/3239; H04L 9/3297
See application file for complete search history.

(56) References Cited

U.S. PATENT DOCUMENTS

| | | | | |
|---|---|---|---|---|
| 9,787,469 | B2 * | 10/2017 | Karame | H04L 9/0618 |
| 10,965,448 | B1 * | 3/2021 | Raman | H04L 67/108 |
| 2010/0098255 | A1 * | 4/2010 | Ciet | H04L 9/0838 380/28 |
| 2019/0332702 | A1 | 10/2019 | Manamohan et al. | |
| 2020/0058007 | A1 * | 2/2020 | Karame | H04L 9/0637 |
| 2023/0043589 | A1 * | 2/2023 | Esmailzadeh | H04L 9/0894 |

FOREIGN PATENT DOCUMENTS

| | | | | |
|---|---|---|---|---|
| CN | 110610416 | A | 12/2019 | |
| CN | 108632293 | B * | 8/2021 | H04L 63/0442 |
| CN | 114095214 | B * | 12/2023 | G06F 21/602 |

OTHER PUBLICATIONS

Xie, AONT-NZZD: A Secure and Efficient Dispersal Scheme in Distributed Storage Systems, Dec. 1, 2019 (Year: 2019).*
NPL Reference (Year: 2019).*
(Continued)

*Primary Examiner* — Michael R Vaughan
*Assistant Examiner* — Saad Ahmad Abdullah
(74) *Attorney, Agent, or Firm* — Panitch Schwarze Belisario & Nadel LLP

(57) ABSTRACT

A method for generating a block for a blockchain utilizing an all-or-nothing transform includes: storing, in a memory of a blockchain node in a blockchain network, a blockchain comprised of a plurality of blocks including at least a most recent block; receiving a plurality of blockchain transactions; applying an all-or-nothing transform (AONT) to the plurality of blockchain transactions to generate a plurality of pseudomessage blocks; generating a new block header including at least a timestamp and a hash value associated with the most recent block; generating a new block including at least the generated new block header and the plurality of pseudomessage blocks; and transmitting the generated new block to a plurality of additional blockchain nodes in the blockchain network.

16 Claims, 5 Drawing Sheets

(56) References Cited

OTHER PUBLICATIONS

Liu Buquan: Overview of the Basic 1-16 Principles of Blockchain 11 , 2021 International Conference on Intelligent Computing, Automation and Applications (ICAA), IEEE, Jun. 25, 2021 (Jun. 25, 2021), pp. 588-593, XP034063489, DOI: 10.1109/ICAA53760.2021. 00108 [retrieved on Dec. 15, 2021] abstractChapter I. "Introduction" Chapter IV. "Logical Structure of Blockchain".
International Search Report and Written Opinion dated Apr. 14, 2023, corresponding to PCT/US2022/051777 (14 Pages).
"Smart Contracts: The Blockchain Technology That Will Replace Lawyers", https://blockgeeks.com/guides/smart-contracts/, retrieved Jan. 2020.
Bhaskaran, et al., "Double-Blind Consent-Driven Data Sharing on Blockchain", 2018 IEEE International Conference on Cloud Engineering (IC2E), Apr. 2018, pp. 385-391.
Mell, et al., "Smart Contract Federated Identity Management without Third Party Authentication Services", arXiv:1906.11057, Jun. 2019, 13 pages.
Nguyen, et al., "CVSS: A Blockchainized Certificate Verifying Support System", Proceedings of the Ninth International Symposium on Information and Communication Technology, Dec. 2018, pp. 436-442.
Rivest, "All-or-Nothing Encryption and the Package Transform", Lecture Notes in Computer Science, vol. 1267, 1997, pp. 210-218.
Wikipedia, "All-or-nothing transform," wikipedia.org/wiki/All-or-nothing_transform, downloaded Dec. 8, 2021, 2 pages.

\* cited by examiner

METHOD AND SYSTEM OF ALL-OR-NOTHING TRANSFORM (AONT) FOR INCREASING BLOCKCHAIN INTEGRITY

FIELD

The present disclosure relates to generation of blocks on a blockchain using an all-or-nothing transform (AONT), specifically the use of an all-or-nothing transform as an alternative to Merkle trees to improve processing times and reduce file sizes for blockchains.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

However, as the chain gets longer the file size of the blockchain increases because of new blocks constantly being added, which can become difficult for storage in systems and especially difficult for onboarding new nodes. In addition, processing times for new blocks also increase as the number of transactions increase, which can lengthen the time it takes for transactions to be verified and added to a blockchain, slowing down the overall processing of blockchain transactions beyond times that may be necessary depending on the application.

Thus, there is a need of a technical improvement to blockchains to reduce processing times and file sizes to provide for more efficient blockchains.

SUMMARY

The present disclosure provides a description of systems and methods for generating new blocks in a blockchain using an all-or-nothing transform (AONT). When new transactions for a blockchain are received, the transactions are validated and then an AONT is applied to the transactions. This generates a set of pseudomessage blocks that can only be generated using the original set of transaction data, thus providing for proper validation of transactions and preventing tampering. A new block header is generated for the next block that includes a timestamp and a reference to the most recently added block in the chain but does not need to include a Merkle root. This reduces the overall file size of a blockchain by making every header smaller and decreases processing times as the transactions do not need to be hashed and no Merkle tree generated. The new header is included in a new block that is generated that also includes the pseudomessage blocks. This new block is added to the blockchain, thus providing for a blockchain with faster processing times and reduced file size without sacrificing security or immutability and maintaining the ability for transactions to be independently verified.

A method for generating a block for a blockchain utilizing an all-or-nothing transform includes: storing, in a memory of a blockchain node in a blockchain network, a blockchain comprised of a plurality of blocks including at least a most recent block; receiving, by a receiver of the blockchain node, a plurality of blockchain transactions; applying, by a processor of the blockchain node, an all-or-nothing transform (AONT) to the plurality of blockchain transactions to generate a plurality of pseudomessage blocks; generating, by the processor of the blockchain node, a new block header including at least a timestamp and a hash value associated with the most recent block; generating, by the processor of the blockchain node, a new block including at least the generated new block header and the plurality of pseudomessage blocks; and transmitting, by a transmitter of the blockchain node, the generated new block to a plurality of additional blockchain nodes in the blockchain network.

A system for generating a block for a blockchain utilizing an all-or-nothing transform includes: a blockchain network including a plurality of additional blockchain nodes; and a blockchain node in the blockchain network including a memory storing a blockchain comprised of a plurality of blocks including at least a most recent block, a receiver receiving a plurality of blockchain transactions, a processor applying an all-or-nothing transform (AONT) to the plurality of blockchain transactions to generate a plurality of pseudomessage blocks, generating a new block header including at least a timestamp and a hash value associated with the most recent block, and generating a new block including at least the generated new block header and the plurality of pseudomessage blocks, and a transmitter transmitting the generated new block to the plurality of additional blockchain nodes in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
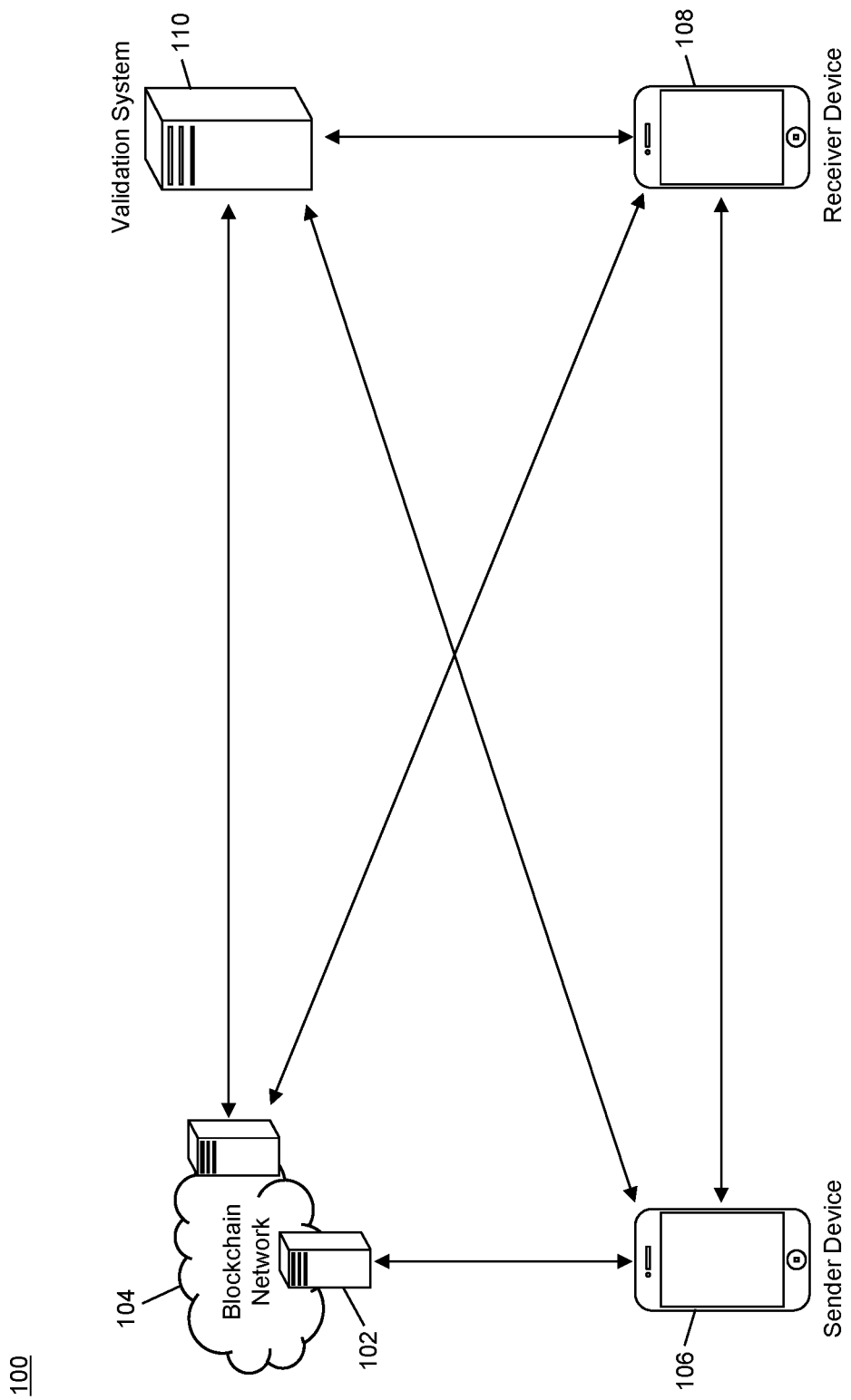
FIG. 1 is a block diagram illustrating a high-level system architecture for generating new blocks in a blockchain using an all-or-nothing transform (AONT) in accordance with exemplary embodiments.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

AONT—First described in Rivest, Ronald, "All-or-nothing encryption and the package transform," FAST SOFTWARE ENCRYPTION Proceedings, Lecture Notes in Computer Science. 1267. pp. 210-218. (1997), ISBN 978-3-540-63247-4, transform includes "preprocessing plaintext by XORing each plaintext block with that block's index encrypted by a randomly chosen key, then appending one extra block computed by XORing that random key and the hashes of all the preprocessed blocks. The result of this preprocessing is called the pseudomessage, and it serves as the input to the encryption algorithm. Undoing the package transform requires hashing every block of the pseudomessage except the last, XORing all the hashes with the last block to recover the random key, and then using the random key to convert each preprocessed block back into its original plaintext block. In this way, it's impossible to recover the original plaintext without first having access to every single block of the pseudomessage," according to Wikipedia (wikipedia.org/wiki/All-or-nothing_transform) Other AONT protocols may be employed.

System for Generating Blocks in a Blockchain Using an all-or-Nothing Transform

FIG. 1 illustrates a system 100 for the generation of new blocks in a blockchain using an all-or-nothing transform (AONT).

Figure 2:
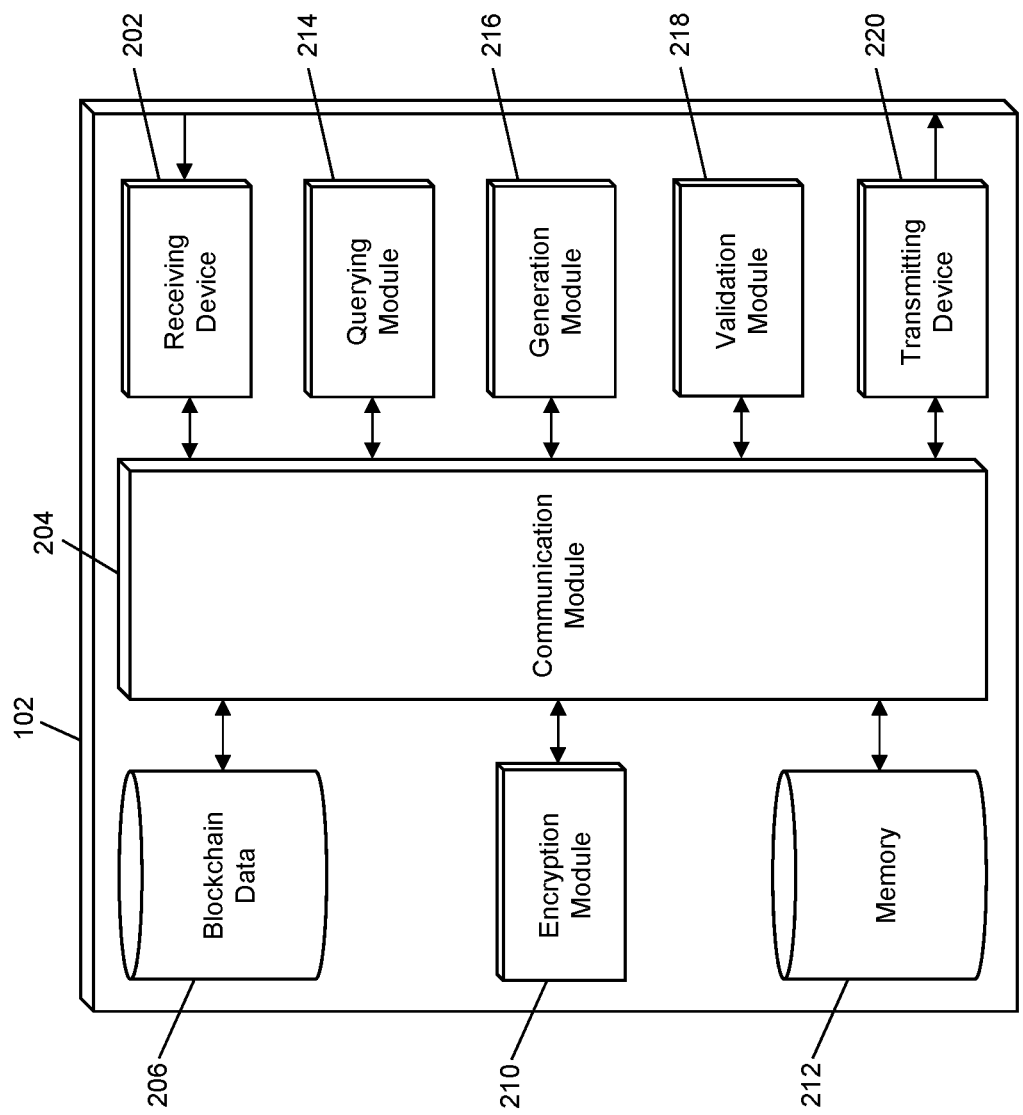
FIG. 2 is a block diagram illustrating a blockchain node of the system of FIG. 1 for generating new blocks in a blockchain using an AONT in accordance with exemplary embodiments.
Figure 5:
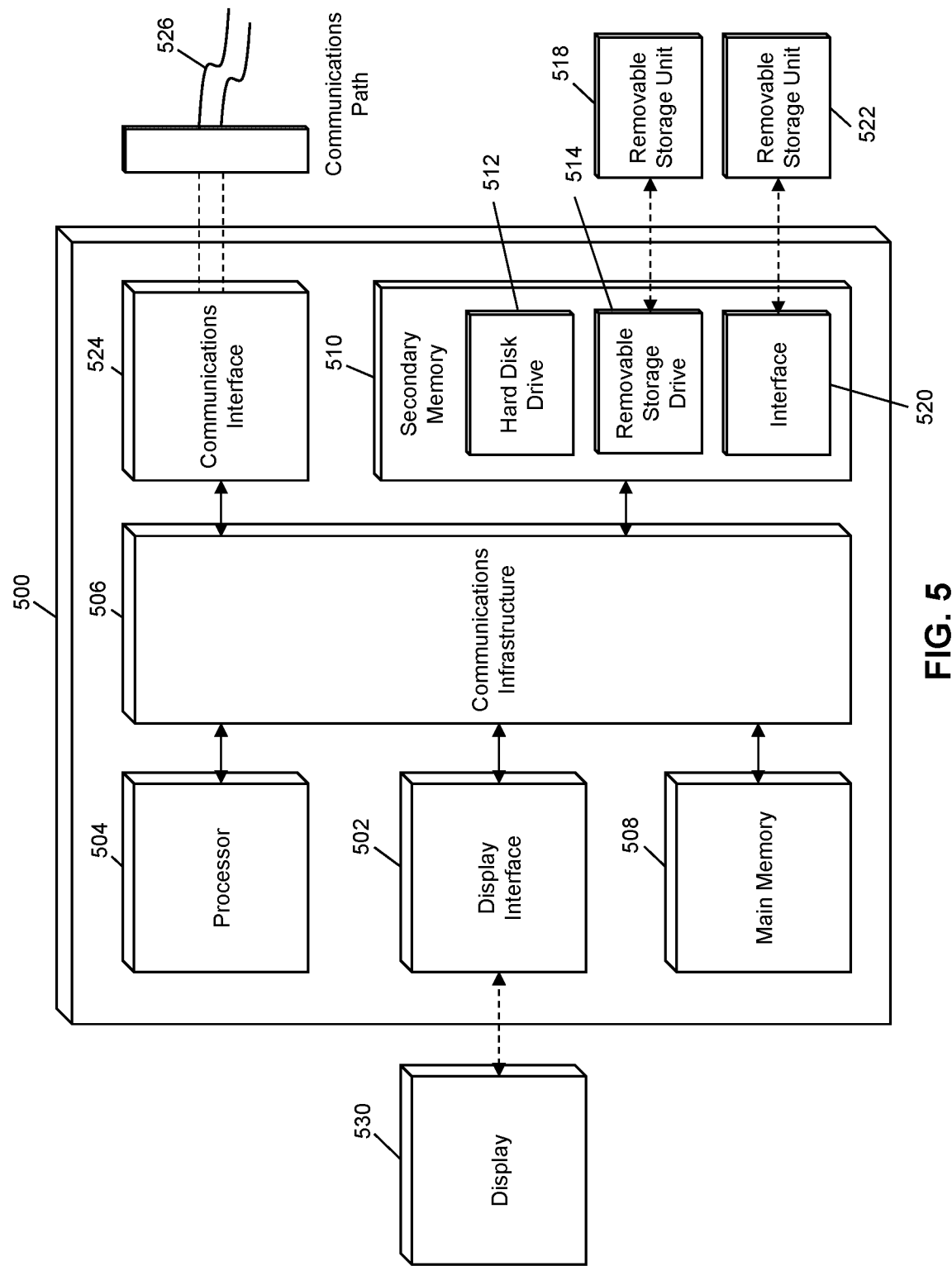
FIG. 5 is a block diagram illustrating a computer system architecture in accordance with exemplary embodiments.

The system 100 may include a blockchain network 104. The blockchain network 104 may be comprised of a plurality of blockchain nodes 102, respectively. Each blockchain node 102 may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values.

Each block header may include at least a timestamp, a block reference value, and a data reference value. The timestamp may be a time at which the block header was generated and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 102 in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 106 and receiver device 108) that stores the private key for use thereof in blockchain transactions. For instance, each computing device may each have their own private key for respective cryptographic key pairs and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency or other data (e.g., a sender device 106) that is generated using the sender's private key, a blockchain address of the recipient of currency or other data (e.g., a receiver device 108) generated using the recipient's public key, and a blockchain currency amount that is transferred, or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 102 in the blockchain network 104, respectively, in traditional blockchain implementations. In cases where a blockchain data value may not be related to a blockchain transaction, but instead the storage of other types of data, blockchain data values may still include or otherwise involve the validation of a digital signature.

In the system 100, a blockchain node 102 may receive a plurality of new blockchain transactions, such as may be submitted thereto by one or more sender devices 106, receiver devices 108, and/or other blockchain nodes 102 in the blockchain network 104. When it is time to generate a new block, the blockchain node 102 may apply an AONT to the plurality of new blockchain transactions that are to be included in the new block. A process to generate a new block may be initiated as a result of the satisfaction of any suitable criteria, such as after a predetermined period of time, a threshold number of new blockchain transactions have been received, etc. In some embodiments, new blockchain transactions may be validated by blockchain nodes 102 prior to their inclusion in a new block. For instance, a blockchain node 102 may validate digital signatures, validate that transaction inputs are unspent, validate the amount of blockchain currency being transferred, etc. If a new blockchain transaction fails validation, that blockchain transaction may not be included in the plurality of new blockchain transactions being included in a new block. In some cases, a blockchain node 102 may encrypt new blockchain transactions prior to the generation of a new block. In such cases, any suitable encryption algorithm and method may be used.

The application of an AONT to the plurality of new blockchain transactions may result in the generation of a plurality of pseudomessage blocks. In an exemplary embodiment, the pseudomessage blocks may be stored in a newly generated block instead of the raw data for the new blockchain transactions. The AONT may be applied to the plurality of new blockchain transactions using any suitable mode of operation, such as a counter mode or a CTRT-CTR mode. The AONT may also use any suitable type of encryption standard, such as the Advanced Encryption Standard (AES). In some cases, the plurality of new blockchain transactions may be formatted prior to application of the AONT. For instance, in one example, the blockchain node 102 may serialize the plurality of blockchain transactions into a byte array using any suitable format.

As part of the generation of a new block, the blockchain node 102 may generate a new block header, such as discussed above. In an exemplary embodiment, the new block header may not include a data reference value. In such embodiments, the blockchain node 102 may generate the new block header and new block without the generation of a Merkle tree and may not include a Merkle root in the new block or new block header. In some cases, the last pseudomessage block in the pseudomessage blocks generated via application of the AONT may be stored in the block header in place of a traditional data reference value. The blockchain node 102 may generate a new block that includes the new block header as well as the pseudomessage blocks generated via the application of the AONT to the plurality of new blockchain transactions. The newly generated block may be transmitted by the blockchain node 102 to a plurality of other blockchain nodes 102 in the blockchain network 104 for confirmation and then included in the blockchain using traditional methods and systems.

The new block may be added to the blockchain and be available for review and/or access by other entities depending on the type of blockchain being used. For instance, in a permissioned blockchain, only authorized entities may have access to newly generated blocks. In a public blockchain, the newly added block may be publicly accessible. Because an AONT is used to transform the new blockchain transactions, the pseudomessage blocks can be used to recreate the plurality of new blockchain transactions provided all of the pseudomessage blocks are used without the use of any keys or other data outside of the data stored in the new block.

In an example, the system 100 may include a validation system 110. For instance, the entities associated with the sender device 106 and receiver device 108 may agree to a business deal where ownership of an item is to be transferred from the receiving entity to the sending entity after the sending entity transfers a suitable amount of blockchain currency to the receiver device 108. The validation system 110 may be an escrow service that has the ability to transfer ownership of the item to the sending entity upon successful receipt of the amount of blockchain currency by the receiver device 108. The sender device 106 may submit a new blockchain transaction to a blockchain node 102 in the blockchain network 104 for the transfer of blockchain currency and report the transaction to the validation system 110. The validation system 110 may wait until the new block is added to the blockchain and recreate the plurality of new blockchain transactions in the block using the transformed pseudomessage blocks. The validation system 110 may review the recreated plurality of blockchain transactions to identify the transaction from the sender device 106 to the receiver device 108 for the appropriate amount of blockchain currency. The validation system 110 may then transfer ownership of the agreed-upon item to the entity associated with the sender device 106.

The methods and systems discussed herein use AONT to transform new blockchain transactions prior to inclusion. The use of AONT enables a new block to be created without a Merkle root, as the transactions can be verified by recreating the transformed transactions due to the use of the AONT. This results in faster generation of new blocks as the extra hashing for generation of the Merkle tree is unnecessary. This may also result in reduced file sizes for blockchains as blockchain headers can contain less data. At the same time, because the transactions are transformed into pseudomessage blocks using the AONT, the transactions can still be independently verified and validated while remaining immutable and safe from fraud. As a result, the methods and systems discussed herein provide for technical improvements over traditional blockchain methods.

Blockchain Node

FIG. 2 illustrates an embodiment of a blockchain node 102, such as included in the blockchain network 104 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, sender devices 106, receiver devices 108, validation systems 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102, which may be superimposed or otherwise encoded with new blockchain transactions, blockchain transaction validations, confirmation messages, reply messages, new blocks, block reference values, etc. The receiving device 202 may be configured to receive data signals electronically transmitted by sender devices 106 or receiver devices 108 that may be superimposed or otherwise encoded with new blockchain transactions, digital signatures, cryptographic keys, requests for blockchain data, etc. The receiving device 202 may also be configured to receive data signals electronically transmitted by validation systems 110, which may be superimposed or otherwise encoded with requests for blockchain data.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as an encryption module 210, querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include blockchain data 206, which may be stored in a memory 212 of the blockchain node 102 or stored in a separate area within the blockchain node 102 or accessible thereby. The blockchain data 206 may include a blockchain, which may be comprised of a plurality of blocks and be associated with the blockchain network 104. The blockchain data 206 may also or alternatively include any data associated with one or more blockchain wallets that may be used by the blockchain node 102, such as cryptographic key pairs, unspent transaction outputs, network identifiers for blockchain networks 104, swap key pairs, signature generation algorithms, encryption algorithms, etc.

The blockchain node 102 may also include a memory 212. The memory 212 may be configured to store data for use by the blockchain node 102 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information for blockchain nodes 102 and blockchain networks 104, address generation and validation algorithms, digital signature generation and validation algorithms, hashing algorithms for generating reference values, AONT rules and algorithms, etc.

The blockchain node 102 may also include an encryption module 210. The encryption module 210 may be configured to encrypt data or decrypt encrypted data using keys and encryption algorithms, such as may be stored in the blockchain data 206 or memory 212 of the blockchain node 102 or received by the receiving device 202 thereof. The encryption module 210 may receive data and an instruction as input, and may encrypt or decrypt the data as instructed, and output the resulting encrypted or decrypted data to another module or engine of the blockchain node 102. The encryption module 210 may be configured to, for example, encrypt digital signatures using a public key, decrypt digital signatures using a private key, encrypt or decrypt blockchain transactions, perform encryption functions as part of an AONT, etc.

The blockchain node 102 may include a querying module 214. The querying module 214 may be configured to execute queries on databases to identify information. The querying module 214 may receive one or more data values or query strings and may execute a query string based thereon on an indicated database, such as the memory 212 of the blockchain node 102 to identify information stored therein. The querying module 214 may then output the identified information to an appropriate engine or module of the blockchain node 102 as necessary. The querying module 214 may, for example, execute a query on the blockchain data 206 to identify received and validated new blockchain transactions for inclusion in a new block to be generated.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate proposal messages, confirmation messages, digital signatures, data signals, key pairs, block headers, blocks, pseudomessage blocks, etc.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to validate digital signatures using suitable signature generation algorithms and keys, validate transaction values, and other data as discussed herein.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, sender devices 106, receiver devices 108, validation systems 110, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to other blockchain nodes 102, which may be superimposed or otherwise encoded with new blockchain transactions, blockchain transaction validations, confirmation messages, reply messages, new blocks, block reference values, etc. The transmitting device 220 may also be configured to electronically transmit data signals to sender devices 106 and receiver devices 108 that may be superimposed or otherwise encoded with requests for digital signatures or other data, new blocks, notifications regarding new blockchain transactions, etc. The transmitting device 220 may also be configured to electronically transmit data signals to validation systems 110, which may be superimposed or otherwise encoded with blocks or other blockchain data.

Process for Generating New Blocks Using an all-or-Nothing Transform

Figure 3:
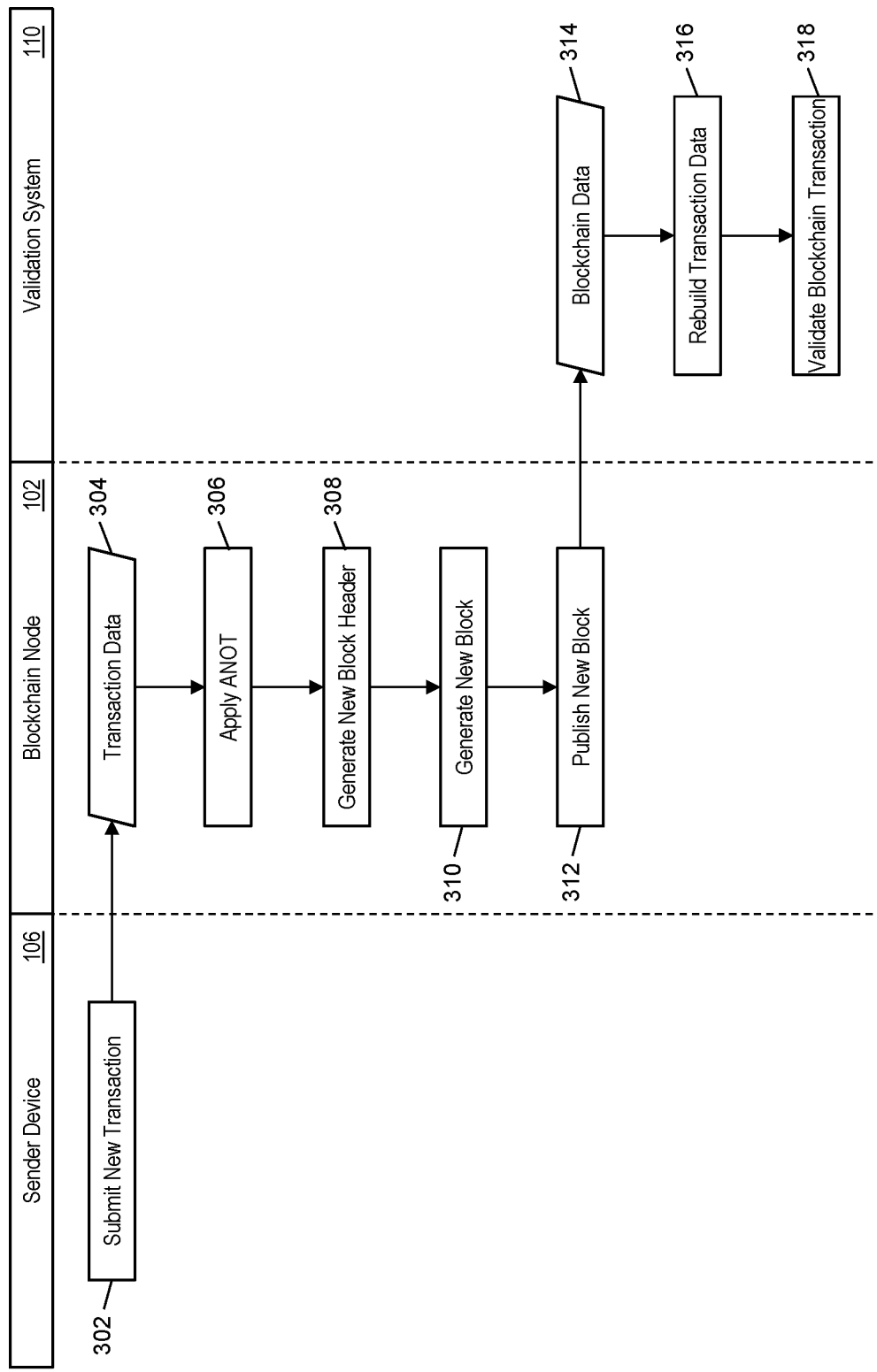
FIG. 3 is a flow diagram illustrating a process for generating new blocks in a blockchain using an AONT in accordance with exemplary embodiments.

FIG. 3 illustrates a process for generating new blocks in the system 100 of FIG. 1 through the use of an all-or-nothing transform (AONT).

In step 302, the sender device 106 may submit a new blockchain transaction to the blockchain node 102 using a suitable communication network and method, such as via an application programming interface, web page, etc. The new blockchain transaction may include a digital signature, one or more unspent transaction outputs, a destination address, and a transaction amount. In step 304, the receiving device 202 of the blockchain node 102 may receive the new blockchain transaction from the sender device 106, which may be one of a plurality of new blockchain transactions received by the blockchain node 102 for inclusion in a new block. In some embodiments, the validation module 218 of the blockchain node 102 may validate each new blockchain transaction as received, where the validation of the new blockchain transaction must be successful for the new blockchain transaction to be included in a new block.

In step 306, the generation module 216 of the blockchain node 102 may apply an AONT to the plurality of new blockchain transactions to generate a plurality of pseudomessage blocks. In one embodiment, the AONT may use AES and a counter mode of operation in transforming the plurality of new blockchain transactions. In some cases, the plurality of new blockchain transactions may first be serialized into a byte array prior to application of the AONT to the byte array. In step 308, the generation module 216 of the blockchain node 102 may generate a new block header for a new block for the blockchain. The new block header may include at least a timestamp and a block reference value, which may be generated via application of a one-way hashing algorithm to the most recent block added to the blockchain. In some cases, the block header may also include an identification value. In an exemplary embodiment, the block header may not include a Merkle root or other data reference value. In step 310, the generation module 216 of the blockchain node 102 may generate a new block for the blockchain. The new block may include the newly generated block header as well as the plurality of pseudomessage blocks generated in step 306.

In step 312, the new block may be published on the blockchain. The block may be published using any suitable method, such as by the transmitting device 220 of the blockchain node 102 electronically transmitting the new block to a plurality of additional blockchain nodes 102 in the blockchain network 104 and the receipt of a confirmation message for the new block from a majority of the additional blockchain nodes 102. The new block may then be publicly available. In step 314, the validation system 110 may receive the new block via any suitable method, such as by requesting the new block from the blockchain node 102 or retrieving the new block from a publicly available source of the blockchain, such as through an application programming interface and the blockchain node 102 itself.

In step 316, the validation system 110 may rebuild, i.e., recreate, the plurality of new blockchain transactions by using the plurality of pseudomessage blocks stored in the new block. In cases where the plurality of new blockchain transactions were serialized prior to application of the AONT, the validation system 110 may recreate the serialized data and may separate the transaction data after the recreation has been performed. The recreation of data using pseudomessage blocks generated via an AONT may be performed using methods that will be apparent to persons having skill in the relevant art based on the AONT and mode of operation used. In step 318, the validation system 110 may validate the new blockchain transaction that was submitted by the sender device 106 in step 302, such as by ensuring the destination address and transaction amount match expected data.

Exemplary Method for Generating a New Block

Figure 4:
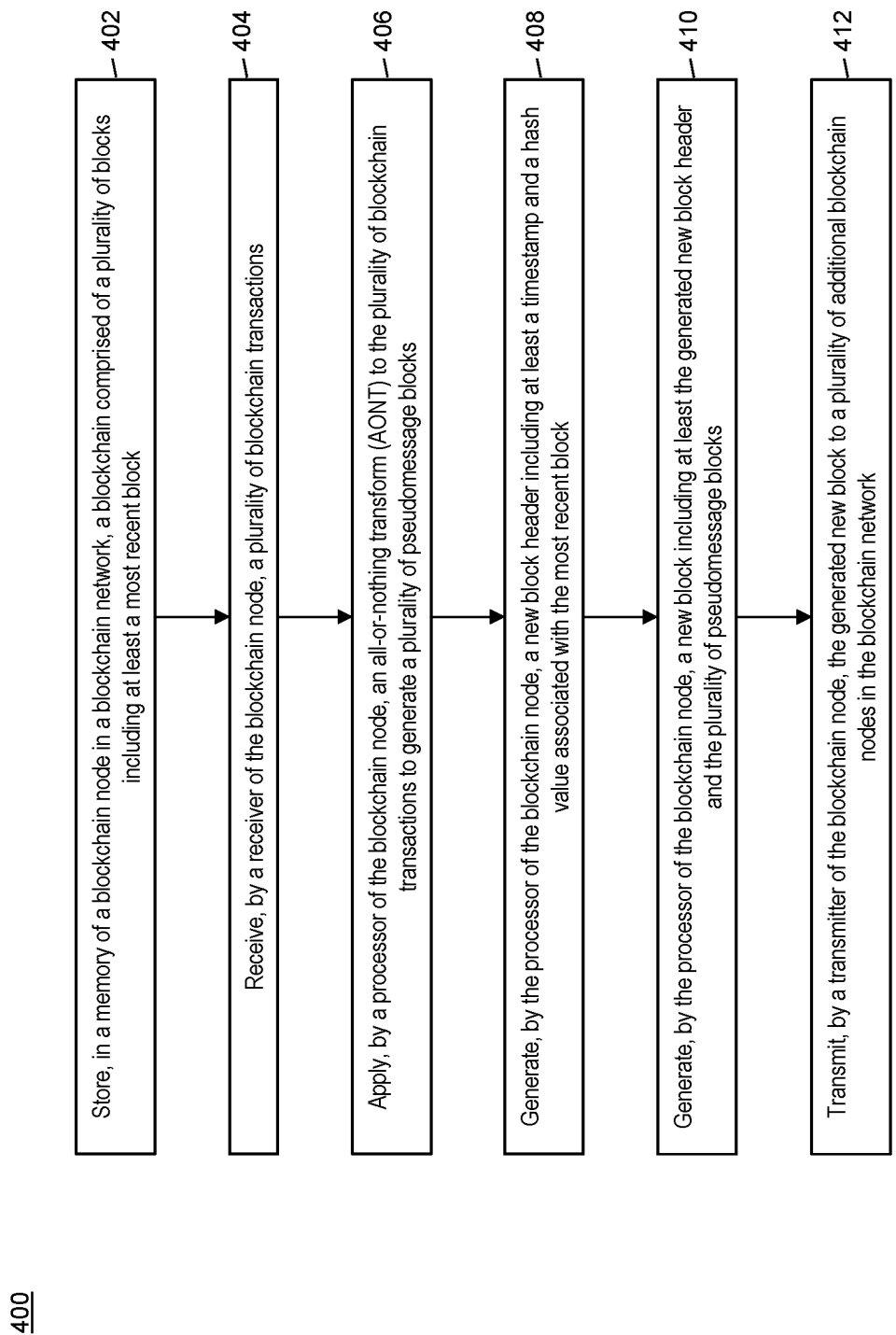
FIG. 4 is a flow chart illustrating an exemplary method for generating a new block in a blockchain using an AONT in accordance with exemplary embodiments.

FIG. 4 illustrates a method 400 for the generation of a new block in a blockchain network by a blockchain node utilizing an all-or-nothing transform.

In step 402, a blockchain comprised of a plurality of blocks including a most recent block may be stored in a memory (e.g., memory 212) of a blockchain node (e.g., blockchain node 102) in a blockchain network (e.g., blockchain network 104). In step 404, a plurality of blockchain transactions may be received by a receiver (e.g., receiving device 202) of the blockchain node. In step 406, an all-or-nothing transform (AONT) may be applied by a processor (e.g., generation module 216) of the blockchain node to the plurality of blockchain transactions to generate a plurality of pseudomessage blocks.

In step 408, a new block header may be generated by the processor of the blockchain node, the new block header including at least a timestamp and a hash value associated with the most recent block. In step 410, a new block may be generated by the processor of the blockchain node, the new block including at least the generated new block header and the plurality of pseudomessage blocks. In step 412, the generated new block may be transmitted by a transmitter (e.g., transmitting device 220) of the blockchain node to a plurality of additional blockchain nodes in the blockchain network.

In one embodiment, the method 400 may further include validating, by the processor (e.g., validation module 218) of the blockchain node, each blockchain transaction of the plurality of blockchain transactions prior to applying the AONT. In some embodiments, the method 400 may also include serializing, by the processor of the blockchain node, the plurality of blockchain transactions into a byte array prior to applying the AONT. In one embodiment, the AONT may use Advanced Encryption Standard (AES). In some embodiments, the AONT may use a counter mode of operation. In one embodiment, each blockchain transaction of the plurality of blockchain transactions may comprise a plaintext block used in the AONT. In some embodiments, the method 400 may further include hashing, by the processor of the blockchain node, each blockchain transaction of the plurality of blockchain transactions, wherein the AONT is applied to each hashed blockchain transaction for the plurality of blockchain transactions. In one embodiment, the new block header may not include a Merkle root.

Computer System Architecture

FIG. 5 illustrates a computer system 500 in which embodiments of the present disclosure, or portions thereof, may be implemented as computer-readable code. For example, the blockchain node 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above-described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower-level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for generating a block for a blockchain utilizing an all-or-nothing transform. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for generating a block for a blockchain utilizing an all-or-nothing transform, comprising:
   storing, in a memory of a blockchain node in a blockchain network, a blockchain comprised of a plurality of blocks including at least a most recent block;
   receiving, by a receiver of the blockchain node, a plurality of blockchain transactions;
   applying, by a processor of the blockchain node, an all-or-nothing transform (AONT) to the plurality of blockchain transactions, for inclusion in a new block, to generate a plurality of pseudomessage blocks;
   generating, by the processor of the blockchain node, a new block header including at least a timestamp and a hash value associated with the most recent block;
   generating, by the processor of the blockchain node, a new block including at least the generated new block header and the plurality of pseudomessage blocks, wherein the new block header and new block are generated without the generation of a Merkle tree and without inclusion of a Merkel root in the new block header or new block; and transmitting, by a transmitter of the blockchain node, the generated new block to a plurality of additional blockchain nodes in the blockchain network.

2. The method of claim 1, further comprising:
validating, by the processor of the blockchain node, each blockchain transaction of the plurality of blockchain transactions prior to applying the AONT.

3. The method of claim 1, further comprising:
serializing, by the processor of the blockchain node, the plurality of blockchain transactions into a byte array prior to applying the AONT.

4. The method of claim 1, wherein the AONT uses Advanced Encryption Standard (AES).

5. The method of claim 1, wherein the AONT uses a counter mode of operation.

6. The method of claim 1, wherein each blockchain transaction of the plurality of blockchain transactions comprises a plaintext block used in the AONT.

7. The method of claim 1, further comprising:
hashing, by the processor of the blockchain node, each blockchain transaction of the plurality of blockchain transactions, wherein
the AONT is applied to each hashed blockchain transaction for the plurality of blockchain transactions.

8. The method of claim 1, wherein the new block header does not include a Merkle root.

9. A system for generating a block for a blockchain utilizing an all-or-nothing transform, comprising:
a blockchain network including a plurality of additional blockchain nodes; and
a blockchain node in the blockchain network including
a memory storing a blockchain comprised of a plurality of blocks including at least a most recent block,
a receiver receiving a plurality of blockchain transactions,
a processor applying an all-or-nothing transform (AONT) to the plurality of blockchain transactions, for inclusion in a new block, to generate a plurality of pseudomessage blocks, generating a new block header including at least a timestamp and a hash value associated with the most recent block, and generating a new block including at least the generated new block header and the plurality of pseudomessage blocks, wherein the new block header and new block are generated without the generation of a Merkle tree and without inclusion of a Merkel root in the new block header or new block, and a transmitter transmitting the generated new block to the plurality of additional blockchain nodes in the blockchain network.

10. The system of claim 9, wherein the processor of the blockchain node further validates each blockchain transaction of the plurality of blockchain transactions prior to applying the AONT.

11. The system of claim 9, wherein the processor of the blockchain node further serializes the plurality of blockchain transactions into a byte array prior to applying the AONT.

12. The system of claim 9, wherein the AONT uses Advanced Encryption Standard (AES).

13. The system of claim 9, wherein the AONT uses a counter mode of operation.

14. The system of claim 9, wherein each blockchain transaction of the plurality of blockchain transactions comprises a plaintext block used in the AONT.

15. The system of claim 9, wherein
the processor of the blockchain node hashes each blockchain transaction of the plurality of blockchain transactions, and
the AONT is applied to each hashed blockchain transaction for the plurality of blockchain transactions.

16. The system of claim 9, wherein the new block header does not include a Merkle root.

\* \* \* \* \*